US012726924B2

(12) United States Patent
Wu

(10) Patent No.: US 12,726,924 B2
(45) Date of Patent: Sep. 1, 2026

(54) UPLINK SYNCHRONIZATION METHOD, TERMINAL DEVICE, AND STORAGE MEDIUM

(71) Applicant: REALME CHONGQING MOBILE TELECOMMUNICATIONS CORP., LTD., Chongqing (CN)

(72) Inventor: Yuqing Wu, Chongqing (CN)

(73) Assignee: REALME CHONGQING MOBILE TELECOMMUNICATIONS CORP., LTD., Chongqing (CN)

( * ) Notice: Subject to any disclaimer, the term of this patent is extended or adjusted under 35 U.S.C. 154(b) by 321 days.

(21) Appl. No.: 18/436,269

(22) Filed: Feb. 8, 2024

(65) Prior Publication Data

US 2024/0179650 A1 May 30, 2024

Related U.S. Application Data

(63) Continuation of application No. PCT/CN2022/109412, filed on Aug. 1, 2022.

(30) Foreign Application Priority Data

Aug. 25, 2021 (CN) ........................ 202110981320.X

(51) Int. Cl.
*H04W 56/00* (2009.01)

(52) U.S. Cl.
CPC ... *H04W 56/0015* (2013.01); *H04W 56/0045* (2013.01)

(58) Field of Classification Search
CPC ...................... H04W 56/0015; H04W 56/0045
See application file for complete search history.

(56) References Cited

U.S. PATENT DOCUMENTS 12,342,303 B2 * 6/2025 Li ...................... H04B 7/18519
2014/0071856 A1 * 3/2014 Brisebois ............. H04W 56/00 370/336

(Continued)

FOREIGN PATENT DOCUMENTS

CN 102469570 A 5/2012
CN 108462989 A 8/2018

(Continued)

OTHER PUBLICATIONS

Chinese First Office Action, Chinese Patent Application No. 202110981320.X, mailed Apr. 13, 2023 (12 pages).

(Continued)

*Primary Examiner* — Duc C Ho
(74) *Attorney, Agent, or Firm* — Ladas & Parry LLP

(57) ABSTRACT

The present disclosure relates to an uplink synchronization method, a terminal device, and a storage medium. The first terminal includes a memory and a processor; the memory stores a computer program; the computer program is executable by the processor to cause the processor to: acquire a timing advance (TA) shared by a second terminal to the first terminal, the second terminal and the first terminal access a same cell, and the second terminal is located within a first range around the first terminal; and perform an uplink synchronization with a base station using the TA shared by the second terminal, in response to the first terminal failing to receive a TA sent by the base station in time.

16 Claims, 3 Drawing Sheets acquiring, by a first terminal, a timing advance (TA) shared by a second terminal to the first terminal, where the second terminal and the first terminal access a same cell, and the second terminal is located within a first range around the first terminal — S201

↓ performing, by the first terminal, an uplink synchronization with a base station using the TA shared by the second terminal, in response to the first terminal failing to receive a TA sent by the base station in time — S202

(56) References Cited

U.S. PATENT DOCUMENTS

| | | | | |
|---|---|---|---|---|
| 2014/0079032 | A1* | 3/2014 | Bergstrom | H04L 5/0078 370/336 |
| 2017/0244639 | A1* | 8/2017 | Szilagyi | H04L 47/193 |
| 2020/0029326 | A1* | 1/2020 | Wang | H04W 56/0045 |
| 2020/0163074 | A1* | 5/2020 | Tang | H04W 72/23 |
| 2021/0212020 | A1 | 7/2021 | Liu et al. | |
| 2022/0191939 | A1* | 6/2022 | Christoffersson | H04W 74/0833 |
| 2023/0029170 | A1* | 1/2023 | Mu | H04W 56/002 |

FOREIGN PATENT DOCUMENTS

| | | | |
|---|---|---|---|
| CN | 109495961 | A | 3/2019 |
| CN | 110062455 | A | 7/2019 |
| CN | 110536286 | A | 12/2019 |
| CN | 111064539 | A | 4/2020 |
| CN | 111093261 | A | 5/2020 |
| CN | 112443952 | A | 3/2021 |
| CN | 113573404 | A | 10/2021 |
| JP | 2017153120 | A | 8/2017 |
| WO | 2017113264 | A1 | 7/2017 |
| WO | 2021003618 | A1 | 1/2021 |
| WO | 2021127915 | A1 | 7/2021 |

OTHER PUBLICATIONS

Chinese Second Office Action, Chinese Patent Application No. 202110981320.X, mailed Sep. 22, 2023 (12 pages).

Chinese Rejection decision, Chinese Patent Application No. 202110981320.X, mailed Jan. 6, 2024 (10 pages).

International Search Report and Written Opinion, International Patent Application No. PCT/CN2022/109412, mailed Oct. 14, 2022 (14 pages).

3GPP tsg_ran\\wg1_rl1; Apr. 7, 2021; "R1-2103108 On Uplink Time and Frequency Synchronization for NTN"; full text; 1-11.

Chinese Review Decision Letter, Chinese Application No. 202110981320.X, mailed Jun. 3, 2024 (2 pages).

Chinese Notification to Grant Patent Right for Invention, Chinese Application No. 202110981320.X, mailed Jun. 5, 2024 (5 pages).

* cited by examiner

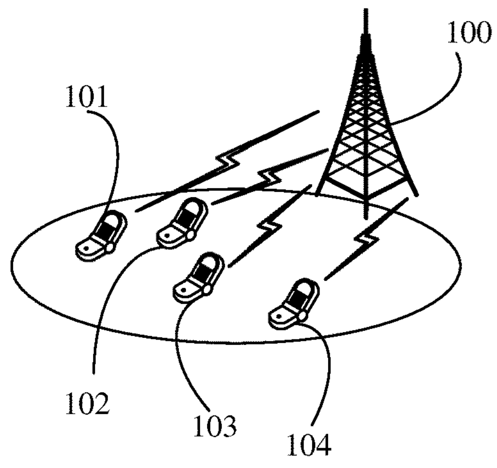

FIG. 1

| acquiring, by a first terminal, a timing advance (TA) shared by a second terminal to the first terminal, where the second terminal and the first terminal access a same cell, and the second terminal is located within a first range around the first terminal | S201 |
|---|---|
| ↓ | |
| performing, by the first terminal, an uplink synchronization with a base station using the TA shared by the second terminal, in response to the first terminal failing to receive a TA sent by the base station in time | S202 |

FIG. 2

| detecting, by the first terminal, quality of service obtained from the cell the first terminal accesses | S301 |
|---|---|
| ↓ | |
| entering, by the first terminal, the idle state, in response to the quality of the service being worse than a first service quality | S302 |

FIG. 3

UPLINK SYNCHRONIZATION METHOD, TERMINAL DEVICE, AND STORAGE MEDIUM

CROSS REFERENCE TO RELATED APPLICATIONS

The present disclosure is a continuation of International Application No. PCT/CN2022/109412 filed Aug. 1, 2022, which claims priority to Chinese Patent Application NO. 202110981320.X, filed on Aug. 25, 2021, both of which are herein incorporated by reference in their entireties.

TECHNICAL FIELD

The present disclosure relates to the technical field of communication, in particular to an uplink synchronization method, a terminal device, and a storage medium.

BACKGROUND

With continuous development of communication technologies, more and more users are using terminals, and stability of network connectivity to the terminals is also increasingly required.

Specifications of the 3rd Generation Partnership Project (3GPP) stipulates that a terminal is required to maintain uplink synchronization with a base station when the terminal is in a network-connected state; when the terminal does not maintain uplink synchronization with the base station, the terminal is required to release time-frequency resources configured previously by the base station through RRC and turn to an idle state. For maintaining uplink synchronization, a new timing advance (TA) configured by the base station should be received within a TA update period to ensure timely update of the TA.

However, when the network is poor in signal strength, or the base station does not send the TA in time, the terminal cannot receive a new TA within the TA update period, so that the terminal has to disconnect from the network and turn to the idle state.

SUMMARY

An uplink synchronization method is provided, the method includes: acquiring, by a first terminal, a timing advance (TA) shared by a second terminal to the first terminal, the second terminal and the first terminal access a same cell, and the second terminal is located within a first range around the first terminal; and performing, by the first terminal, an uplink synchronization with a base station using the TA shared by the second terminal, in response to the first terminal failing to receive a TA sent by the base station in time.

A first terminal is provided, the first terminal includes a memory and a processor, the memory stores a computer program, the computer program is executable by the processor to cause the processor to: acquire a timing advance (TA) by the first terminal shared by a second terminal to the first terminal, wherein the second terminal and the first terminal access a same cell, and the second terminal is located within a first range around the first terminal; and perform an uplink synchronization with a base station by the first terminal using the TA shared by the second terminal, in response to the first terminal failing to receive a TA sent by the base station in time.

A non-transitory computer-readable storage medium is provided, on which a computer program is stored, and the operations described in the first aspect are implemented when the computer program is executed by a processor.

BRIEF DESCRIPTION OF THE DRAWINGS

FIG. 1 is a schematic diagram of a communication system applied to a technical solution according to the present disclosure.

FIG. 2 is a schematic flowchart of an uplink synchronization method according to some embodiments of the present disclosure.

FIG. 3 is a schematic flowchart of a method for a first terminal to turn to an idle state according to some embodiments of the present disclosure.

DETAILED DESCRIPTIONS

Figure 4:
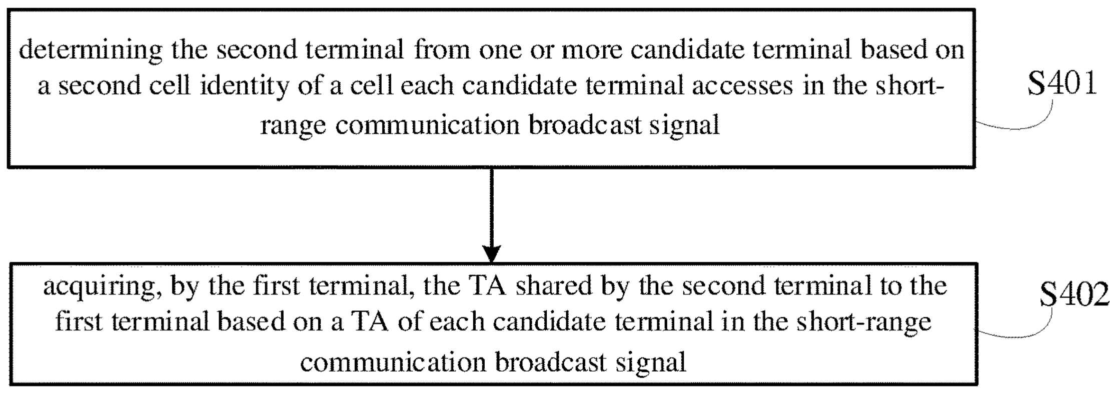
FIG. 4 is a schematic flowchart of a method for a first terminal to obtain a TA of a second terminal according to some embodiments of the present disclosure.

In order to make the purpose, technical solution and advantages of the present disclosure clearer, the present disclosure will be further described in detail below in conjunction with the accompanying drawings and embodiments. It should be understood that the specific embodiments described here are only used to explain the present disclosure, and are not intended to limit the present disclosure.

FIG. 1 is a schematic diagram of a communication system applied to a technical solution according to the present disclosure. The communication system may include a base station 100 and multiple terminals, among which only a terminal 101, a terminal 102, a terminal 103, and a terminal 104 are shown in FIG. 1. FIG. 1 is only a schematic diagram, and does not constitute a limitation on the applicable scenarios of the technical solution according to the present disclosure.

The base station 100 may be a transmission reception point (TRP), a base station, a repeater station, or an access point, etc. The base station 100 may be a base station in a 5G communication system or in a future evolution network; the base station 100 may further be a wearable device or a vehicle-mounted device, etc.; the base station 100 may further be: a base transceiver station (BTS) in a global system for mobile communication (GSM) or a code division multiple access (CDMA) network, or a NB (NodeB) in a wideband code division multiple access (WCDMA), or an eNB or eNodeB (evolutional NodeB) in a long term evolution (LTE) system; the base station 100 may further be a wireless controller in a scenario of a cloud radio access network (CRAN). Hereinafter, the present disclosure will take the base station as an example for description.

The terminal may be a user equipment (UE), an access terminal, a UE unit, a UE station, a mobile station, a remote station, a remote terminal, a mobile device, a UE terminal, a wireless communication device, a UE proxy or a UE apparatus, etc. The access terminal may be a mobile phone, a cordless phone, a session initiation protocol (SIP) phone, a wireless local loop (WLL) station, a personal digital assistant (PDA), a handheld device with a wireless communication function, a computing device or other processing devices connected to wireless modems, a vehicle-mounted device, a wearable device, a terminal in the 5G network or a terminal in the future evolved public land mobile network (PLMN) network, etc.

In order to introduce the embodiments of the present disclosure more clearly, the TA involved in the present disclosure is firstly introduced here. The TA, also timing advance, is generally used for uplink transmission of the terminal. In order to ensure that uplink packets of the terminal arrive the base station at a desired time, the uplink packets are sent out corresponding time in advance according to an estimated radio-frequency transmission delay caused by distance, and the corresponding time for sending in advance is the TA. Since multiple terminals may access the same cell at the same time, and the multiple terminals are in a connected state at the same time, the base station configures the TA for each terminal to realize that the signals of various terminals at different distances from the base station arrive at the base station at the same time, so that the base station may demodulate the signals of each terminal correctly to ensure that the uplink transmission of different terminals from the same cell will not interfere with each other.

As long as the base station receives uplink data sent by the terminal within a range of cyclic prefix (CP), the base station may decode the uplink data correctly. Therefore, it is required for the uplink synchronization that the time of signals of various terminals from the same subframe arriving the base station is within the range of the CP. However, due to different distances between various terminals and the base station, Doppler frequency shift caused by moving of the terminals, and different transmission time of multipath, etc., various terminals are required to has different TA to send the uplink packets. For a terminal that is far away from the cell, the uplink packets are required to be sent early in advance due to a large transmission delay; and for a terminal that is close to the cell, the TA may be relatively small. The base station may send the TA to the terminal through a timing advance command (TAC).

In the communication system shown in FIG. 1, the base station 100 may send the TA configured for a terminal to the terminal through downlink resources, and the terminal may broadcast a short-range communication broadcast signal after receiving the TA configured by the base station. The short-range communication broadcast signal may include a cell identity of the cell the terminals access and the TA received by the terminal. For example, after the base station 100 sends the TA for the terminal 101 to the terminal 101, the terminal 101 may broadcast a short-range communication broadcast signal, and the short-range communication broadcast signal may include a cell identity of the cell that the terminal 101 accesses and the TA received by the terminal 101.

Similarly, the terminal 102, the terminal 103, and the terminal 104 may each broadcast a short-range communication broadcast signal after receiving the TA configured by the base station.

After the terminal broadcasts the short-range communication broadcast signal, other terminals within a first range around the terminal broadcasting the short-range communication broadcast signal may receive the short-range communication broadcast signal. For example, when the terminal 102, the terminal 103, and the terminal 104 are the terminals located within the first range around the terminal 101, after the terminal 101 broadcasts the short-range communication broadcast signal, the terminal 102, the terminal 103, and the terminal 104 may all receive the short-range communication broadcast signal. The first range may be, for example, a range within 10 meters around the terminal.

It should be noted that the terminal may search for the terminals, the distance of which to the searching terminal is within the first range, by using a short-range communication technology. The searching terminal may also determine the terminals within the first range around the searching terminal based on position information of the terminals provided by the global positioning system (GPS) in the received short-range communication broadcast signal and its own position information provided by the GPS.

In the traditional technology, when the network is poor in signal strength, or the network side fails to send the TA in time, the terminal cannot receive a new TA within the TA update period, so that the terminal has to disconnect from the network and turn to the idle state. The TA update period may be a TA timer, and the terminal is required to turn to the idle state according to 3GPP protocols when no new TA configured by the base station is received upon the timer expiring. However, in the technical solution of the present disclosure, when the first terminal fails to receive the new TA within a certain period of time, the TA of the second terminal may be used for the first terminal maintaining uplink synchronization with the base station, thereby maintaining network connectivity. In order to describe the technical solution of the present disclosure more clearly, in the technical solution of the present disclosure based on the communication system shown in FIG. 1, the terminal that fails to receive the new TA within the TA update period is called the first terminal, the cell identity of the cell that the first terminal accesses is called a first cell identity, the terminal located within the first range around the first terminal is called a candidate terminal, and the cell identity of the cell that the candidate terminal accesses is called a second cell identity.

When the first terminal fails to receive the TA sent by the base station within a certain period of time, the second cell identity of the cell that the candidate terminal accesses may be queried according to a terminal identity of the candidate terminal, and the candidate terminal, whose corresponding second cell identity is the same as the first cell identity, may be taken as the second terminal, and the TA of the second terminal is queried, and the TA of the second terminal is applied to maintain uplink synchronization with the base station. Therefore, uplink synchronization with the base station can be realized by using the TA of the second terminal to maintain network connectivity with the base station, when the first terminal fails to receive the new TA within a certain period of time.

It should be noted that since the TA of the second terminal has a small difference with the TA configured by the base station for the first terminal, in the case of the first terminal failing to receive the TA configured by the base station for the first terminal within the certain period of time, the TA of the second terminal may be directly used to perform uplink synchronization with the base station.

The technical solution provided in the present disclosure may further be applicable to another communication system, which includes a server, a base station 100, and multiple terminals as shown in FIG. 1. In the technical solution based on this communication system, when a terminal receives a TA configured by the base station, the terminal may send notification information to the server, where the notification information may include a cell identity of a cell the terminal accesses, the TA of the terminal, and a terminal identity of a candidate terminal searched by the terminal based on the short-range communication technology. The server may send the TA of the candidate terminal of the terminal to the terminal in real time or periodically, or the server may send the TA of a second terminal within a first range around the terminal to the terminal in real time or periodically, where the second terminal is located within the first range around the terminal and accesses the same cell as the terminal.

It should be noted that, based on the communication system, the server may query a second cell identity of a cell that the candidate terminal accesses according to the terminal identity of the candidate terminal corresponding to the terminal, and takes the candidate terminal whose corresponding second cell identity is the same as the first cell identity as the second terminal, so as to query the TA of the second terminal, and send the TA of the second terminal of the terminal to the terminal in real time or periodically.

When the first terminal fails to receive the TA sent by the base station within the certain period of time, the first terminal may directly use the TA of the second terminal received from the server to perform uplink synchronization with the base station.

In order to introduce the embodiments of the present disclosure more clearly, description is provided further with reference to FIG. 2. FIG. 2 is a schematic flow chart of an uplink synchronization method according to some embodiments of the present disclosure. The embodiments of the present disclosure relate to a process the terminal performing uplink synchronization with the base station. The subject to execute the method may be the first terminal, and the method may be applied to any communication system described above. With reference to FIG. 2, the method includes operations at blocks illustrated in FIG. 2.

At block S201: acquiring, by a first terminal, a timing advance (TA) shared by a second terminal to the first terminal, where the second terminal and the first terminal access a same cell, and the second terminal is located within a first range around the first terminal.

In some embodiments, the acquiring, by a first terminal, a timing advance (TA) shared by a second terminal to the first terminal may be specifically implemented by: acquiring, by the first terminal, the TA of the second terminal from a server, where the TA of the second terminal is uploaded by the second terminal to the server.

The TA of the second terminal is stored in the server, and the server may send the TA of the second terminal to the first terminal in real time or periodically, so that the first terminal obtains the TA of the second terminal. Alternatively, when the server receives a sharing request sent by the first terminal, the server sends the TA of the second terminal to the first terminal in response to the sharing request, so that the first terminal acquires the TA of the second terminal.

In some embodiments, the acquiring, by a first terminal, a timing advance (TA) shared by a second terminal to the first terminal may be specifically implemented by: acquiring, by the first terminal, the TA of the second terminal based on a short-range communication broadcast signal received by the first terminal.

The second terminal may broadcast the short-range communication broadcast signal when receiving the TA configured by the base station, and the first terminal may receive the short-range communication broadcast signal broadcasted by the second terminal and acquire the TA of the second terminal based on the short-range communication broadcast signal.

At block S202: performing, by the first terminal, an uplink synchronization with a base station using the TA shared by the second terminal, in response to the first terminal failing to receive a TA sent by the base station in time.

It should be noted that, when the first terminal fails to receive the TA sent by the base station in time, and the first terminal has not acquired the TA of the second terminal, the first terminal may send the sharing request to the server, and the sharing request is configured to instruct the server to send the TA of the second terminal to the first terminal, so that the first terminal can receive the TA of the second terminal sent by the server to the first terminal in response to the sharing request.

When the first terminal fails to receive the TA sent by the base station in time, the first terminal has already acquired the TA of the second terminal, the TA of the second terminal can directly be used to perform uplink synchronization with the base station, thereby ensuring that the first terminal performs uplink synchronization with the base station as soon as possible.

In the uplink synchronization method according to the embodiments, the first terminal acquires the TA shared by the second terminal to the first terminal, the first terminal uses the TA shared by the second terminal to perform uplink synchronization with the base station in response to the first terminal failing to receive the TA sent by the base station in time, so that the first terminal can still perform uplink synchronization with the base station using the TA of the second terminal to enable the first terminal to maintain network connectivity with the base station when the first terminal fails to receive the TA sent by the base station in time.

In some embodiments, the performing, by the first terminal, an uplink synchronization with the base station using the TA shared by the second terminal may be specifically implemented by: performing, by the first terminal, the uplink synchronization with the base station using the TA shared by the second terminal, in response to an uplink synchronization state of the first terminal meeting a shared TA using condition.

In some embodiments, the shared TA using condition may include: a number of times the first terminal performs the uplink synchronization with the base station using the TA shared by another terminal in history being less than a first number of times.

It should be noted that the first number may be, for example, 2, when the number of times the first terminal performs the uplink synchronization with the base station using the TA shared by another terminal in history is 1, then the first terminal can perform the uplink synchronization with the base station using the TA shared by the second terminal for one time.

In this embodiment, the first terminal performs the uplink synchronization with the base station using the TA shared by the second terminal in response to the uplink synchronization state of the first terminal meeting the shared TA using condition. The terminal that fails to receive an updated TA in time is allowed to maintain uplink synchronization with the base station by using the TA of the terminal connected to the same cell as itself. When the network is not very poor in signal strength, the first terminal may quickly receive a new TA configured by the base station, so that the first terminal can use the TA of the terminal connected to the same cell as itself for a short transition, furthermore, the terminal can be prevented from entering the idle state, and time-frequency resources may be released.

In some embodiments, the shared TA using condition may include: a duration of the first terminal performing the uplink synchronization with the base station using a TA shared by another terminal in history being less than a first duration.

The first duration may be, for example, two certain durations set by a timer, the first duration is 10 seconds in response to one certain duration being 5 seconds.

In this embodiment, the first terminal performing uplink synchronization with the base station using the TA shared by the second terminal in response to the uplink synchronization state of the first terminal meeting the shared TA using condition, so that the first terminal that fails to receive the updated TA in time is allowed to maintain non-desynchronization state within the first duration. When the network is not very poor in signal strength, the first terminal may quickly receive a new TA configured by the base station, so that the first terminal can use the TA of the second terminal for a short transition, furthermore, the terminal can be prevented from entering the idle state, and time-frequency resources may be released.

It should be noted that the shared TA using condition may include: a number of times the first terminal performs uplink synchronization with the base station using the TA shared by another terminal in history being less than a first number, and the duration of the first terminal performs uplink synchronization with the base station using the TA shared by another terminal in history being shorter than the first duration.

In some embodiments, the shared TA using condition may include: a difference between the TA received by the first terminal from the base station last time and the TA shared by the second terminal being less than a first difference.

It should be noted that the difference between the TA that the first terminal received last time from the base station and the TA shared by the second terminal is less than the first difference, means that the TA shared by the second terminal to the first terminal and the TA configured by the base station for the first terminal has a slight difference, and the first terminal may perform the uplink synchronization with the base station using the TA shared by the second terminal directly.

In this embodiment, the first terminal performs the uplink synchronization with the base station using the TA shared by the second terminal in response to the difference between the TA received by the first terminal from the base station last time and the TA shared by the second terminal being less than the first difference, ensuring the terminal that fails to receive the updated TA in time to continue to maintain a non-desynchronization state. When the network is not very poor in signal strength, the first terminal may quickly receive the new TA configured by the base station, so that the first terminal is enable to use the TA of the second terminal for a short transition to prevent the terminal from entering an idle state and release time-frequency resources.

In some embodiments, the method may further include the following operations: entering, by the first terminal, an idle state, in response to the first terminal not meeting the shared TA using condition.

In this embodiment, entering, by the first terminal, the idle state and releasing time-frequency resources in response to the first terminal being at the non-desynchronization state not meeting the shared TA using condition, so that preventing the first terminal from being forced to maintain network connectivity with the base station for a long time when the first terminal has not received the TA updated by the base station for a long time due to poor network signal, which may cause interference to the cell the first terminal accesses.

In some embodiments, the method may further include the following operations: entering, by the first terminal, the idle state and releasing time-frequency resources in response to the first terminal being at the non-desynchronization state not meeting the shared TA using condition.

In some embodiments, FIG. 3 is a schematic flow chart of a method for a first terminal to turn to an idle state according to some embodiments of the present disclosure. The embodiments relate to an optional implementation for entering an idle state when a first terminal does not meet a shared TA using condition. On the basis of the aforesaid embodiments, entering, by the first terminal, an idle state, in response to the first terminal at the non-desynchronization state not meeting the shared TA using condition may be achieved by the following operations:

At operation S301, detecting, by the first terminal, quality of service obtained from the cell the first terminal accesses.

At operation S302, entering, by the first terminal, the idle state, in response to the quality of the service being worse than a first service quality.

In this embodiment, before entering the idle state by the first terminal, the quality of the service obtained by the first terminal from the cell the first terminal accesses may be further detected. Entering the idle state in response to the quality of the service being worse than the first service quality. The first terminal enters the idle state only when it is ensured that the first terminal cannot continue to use the TA of the second terminal.

In some embodiments, the method may further include the following operations: performing, by the first terminal, the uplink synchronization with the base station using the TA of the second terminal, in response to the quality of the service being the same as or better than the first service quality.

In this embodiment, when the first terminal does not meet the shared TA using condition, the quality of the service obtained by the first terminal from a cell the first terminal accesses may further be detected. In the case of the quality of the service being the same as or better than the first service quality, the TA of the second terminal may still be used to perform uplink synchronization with the base station. That is to say, a duration that the first terminal uses the TA of the second terminal can be extended to continue to use the TA of the second terminal to perform uplink synchronization with the base station in response to not meeting the shared TA using condition and the quality of the service obtained by the first terminal from the cell the first terminal accesses being good, so as to maintain network connectivity with a base station for a longer period of time.

In some embodiments, the aforesaid operation S201 may further be implemented by:

Acquiring, by the first terminal, the TA shared by the second terminal to the first terminal from a server, wherein the server is configured to receive and store the TA shared by the second terminal.

The TA of the second terminal is stored in the server, and the server may send the TA of the second terminal to the first terminal in real time or periodically, so that enabling the first terminal to acquire the TA of the second terminal. Alternatively, when the server receives a sharing request sent by the first terminal, the server obtains the TA of the second terminal and sends the TA of the second terminal to the first terminal in response to the sharing request, so that enabling the first terminal to acquire the TA of the second terminal.

In the uplink synchronization method according to this embodiment, the first terminal can acquire the TA shared by the second terminal to the first terminal from the server, so that when the first terminal fails to receive the TA sent by the base station in time, uplink synchronization with the base station can still be performed by using the TA of the second terminal, thereby enabling the first terminal to maintain network connectivity with the base station.

In some embodiments, the aforesaid operation S201 may further be implemented by:

Acquiring, by the first terminal, a short-range communication broadcast signal broadcasted by the second terminal based on a short-range communication technology, wherein the short-range communication broadcast signal carries the TA shared by the second terminal.

As shown in FIG. 4, FIG. 4 is a schematic flow chart of a method for a first terminal to obtain a TA of a second terminal according to some embodiments of the present disclosure. The embodiments provide a method based on the communication system shown in FIG. 1. This embodiment relates to an optional implementation for the first terminal obtaining the TA of the second terminal by receiving the short-range communication broadcast signal broadcasted by the second terminal based on the short-range communication technology. Specifically, acquiring, by the first terminal, the TA of the second terminal based on the short-range communication broadcast signal received by the first terminal may be performed through the following operations:

At operation S401, determining the second terminal from one or more candidate terminal based on a second cell identity of a cell each candidate terminal accesses in the short-range communication broadcast signal.

The short-range communication broadcast signal that the first terminal receives includes the second cell identity of a cell the candidate terminal accesses, the first terminal may take the candidate terminal whose corresponding second cell identity is the same as the first cell identity the first terminal accesses as the second terminal. Each candidate terminal corresponding to the second cell identity identical to the first cell identity may be taken as the second terminal, or any one of the candidate terminals corresponding to the second cell identity identical to the first cell identity may be taken as the second terminal.

At operation S402, acquiring, by the first terminal, the TA shared by the second terminal to the first terminal based on a TA of each candidate terminal in the short-range communication broadcast signal.

In this embodiment, the short-range communication broadcast signal broadcasted by the candidate terminal may include the TA of the candidate terminal. Therefore, when the second terminal is determined from the candidate terminal, the TA of the second terminal may be obtained based on the TA of the candidate terminal.

In this embodiment, determining the second terminal from one or more candidate terminal based on the second cell identity of a cell each candidate terminal accesses in the short-range communication broadcast signal, so that acquiring the TA of the second terminal based on the TA of the candidate terminal in the short-range communication broadcast signal, thereby the uplink synchronization with the base station may be performed directly using the TA acquired from the second terminal when the first terminal fails to receive the TA sent by the base station in time, and maintaining the network connectivity with the base station, and no need to deploy other communication devices, so that the cost of acquiring the TA of the second terminal may be reduced.

In some embodiments, based on the communication system including a server provided by the present disclosure, before the acquiring, by the first terminal, the TA shared by the second terminal to the first terminal from a server, the method may further include the following operations:

Sending, by the first terminal, notification information to the server; the notification information comprises a first cell identity of the cell the first terminal accesses and a terminal identity of a candidate terminal searched by the first terminal based on a short-range communication technology, and the notification information is configured for the server to determine the second terminal.

The short-range communication technology may include, for example, Bluetooth, infrared communication technology, etc.

In some embodiments, based on the communication system including a server provided by the present disclosure, the sending, by the first terminal, notification information to the server may be implemented by:

Sending, by the first terminal, the notification information to the server, in response to the first terminal failing to receive the TA sent by the base station in time.

In some embodiments, based on the communication system including a server provided by the present disclosure, the sending, by the first terminal, notification information to the server may further be implemented by:

Sending, by the first terminal, the notification information to the server, in response to the first terminal receiving the TA sent by the base station, the notification information further comprises the TA received by the first terminal.

In this embodiment, the first terminal may send the notification information to the server in response to the first terminal receiving the TA sent by the base station. When the number of the second terminals is more than one, the TA of the first terminal may be configured to determine a difference between the TA of the multiple second terminals and the historical TA sent by the base station to the first terminal last time by the server, the TA of the second terminal corresponding to the smallest difference may be used as the TA shared by the second terminal to the first terminal. It should be noted that the TA sent by the base station to the first terminal last time stored in the server is the historical TA of the first terminal. When the network signal is strong, the first terminal can receive the TA sent by the base station within a certain period of time, and upload the TA to the server through the notification information, and the server stores the TA. When the first terminal does not receive the TA sent by the base station within the certain period of time due to the deterioration of the network signal or the network side sending the TA not timely within the next certain period of time, that is, the first terminal fails to receive the TA in time, the server has already stored the TA sent by the base station to the first terminal last time, that is, the historical TA of the first terminal has been stored in the server. The certain period of time may be realized by a timer, or may be realized by a chronometer.

Figure 5:
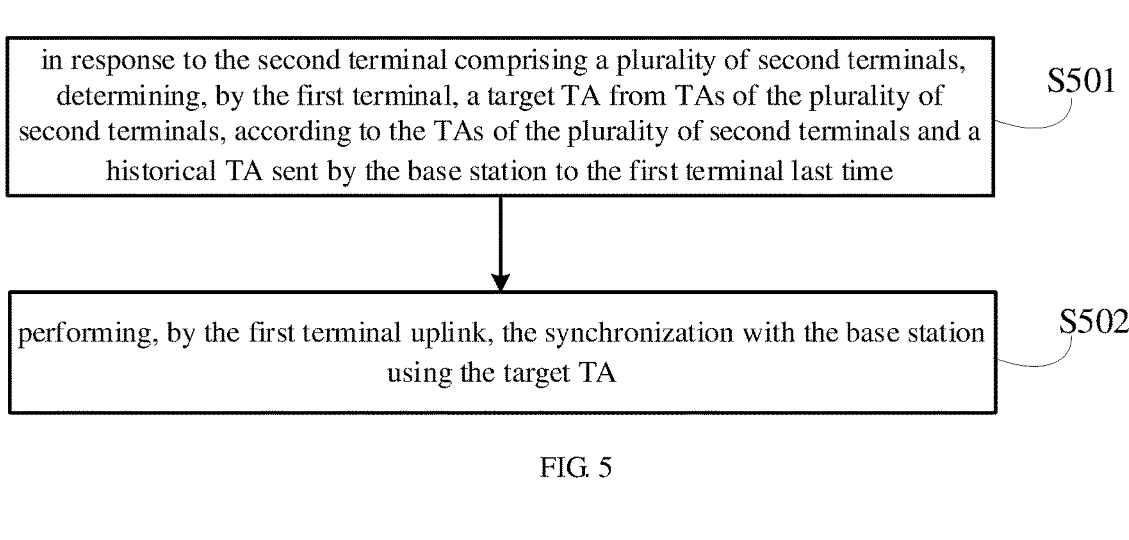
FIG. 5 is a schematic flowchart of a method for a first terminal to perform uplink synchronization with a base station according to some embodiments of the present disclosure.

In some embodiments, FIG. 5 is a schematic flow chart of a method for a first terminal to perform uplink synchronization with a base station according to some embodiments of the present disclosure. The method provided by this embodiment may be implemented based on the communication system shown in FIG. 1 above, or based on the communication system including the server. This embodiment relates to an optional implementation the first terminal performs uplink synchronization with the base station using the TA shared by the second terminal. On the basis of the aforesaid embodiments, an implementation for performing the aforesaid operation S202 may include the following operations:

At operation S501, in response to the second terminal comprising a plurality of second terminals, determining, by the first terminal, a target TA from TAs of the plurality of second terminals, according to the TAs of the plurality of second terminals and a historical TA sent by the base station to the first terminal last time.

In some embodiments, the determining, by the first terminal, a target TA from TAs of the plurality of second terminals, according to the TAs of the plurality of second terminals and a historical TA sent by the base station to the first terminal last time may be implemented by:

Determining, by the first terminal, a product of each of the TAs of the plurality of second terminals and the historical TA sent by the base station to the first terminal last time.

Taking, by the first terminal, one of the TAs of the plurality of second terminals corresponding to a minimum product as the target TA.

It should be noted that the less the product of the time advance of a certain second terminal and the historical TA of the first terminal, the closer the TA of the second terminal and the historical TA of the first terminal is.

At operation S502, performing, by the first terminal uplink, the synchronization with the base station using the target TA.

In this embodiment, when the number of the second terminals is more than one, determining the target TA from the TAs of each second terminal according to the TAs of each second terminal and the historical TA sent by the base station to the first terminal last time, and performing the uplink synchronization with the base station using the target TA, and the target TA is the TA of the second terminal corresponding to the minimum product, so as to take the TA of the second terminal closest to the historical TA of the first terminal as the target TA.

Figure 6:
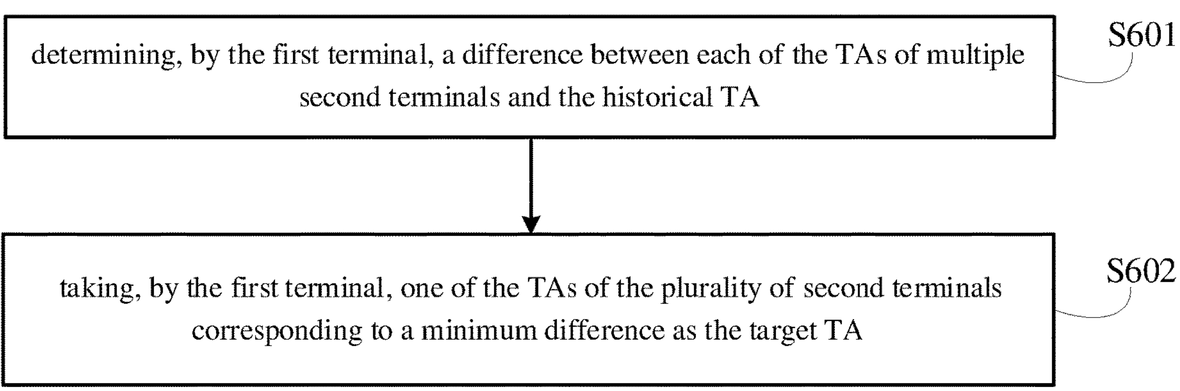
FIG. 6 is a schematic flowchart of a method for determining a target TA according to some embodiments of the present disclosure.

In some embodiments, FIG. 6 is a schematic flowchart of a method for determining a target TA according to some embodiments of the present disclosure. This embodiment relates to an optional implementation of a process a first terminal determining a target TA from TAs of each second terminal according to the TAs of each second terminal and a historical TA sent by a base station to the first terminal last time. On the basis of the aforesaid embodiments, an implementation for performing the aforesaid operation S501 may include the following operations:

At operation S601, determining, by the first terminal, a difference between each of the TAs of multiple second terminals and the historical TA.

In this embodiment, the less the product of the time advance of a certain second terminal and the historical TA of the first terminal, the closer the TA of the second terminal and the historical TA of the first terminal is.

At operation S602, taking, by the first terminal, one of the TAs of the plurality of second terminals corresponding to a minimum difference as the target TA.

In this embodiment, when the number of the second terminals is more than one, the first terminal determines the difference between each of the TAs of multiple second terminals and the historical TAs respectively, and takes one of the TAs of the multiple second terminals corresponding to the minimum difference as the target TA, so that the target TA can be used to perform uplink synchronization with the base station, and realizing that takes the TA of the second terminal closest to the historical TA of the first terminal as the target TA.

It should be understood that although the various operations in the flowcharts of FIG. 2-FIG. 6 are shown sequentially as indicated by the arrows, these operations are not necessarily executed sequentially in the order indicated by the arrows. Except as otherwise noted in the present disclosure, the execution of these operations has no strict order restriction, and these operations can be executed in other orders. Moreover, at least some of the operations shown in FIG. 2-FIG. 6 may include multiple actions or stages, these actions or stages are not necessarily executed at the same moment, but may be executed at different moments, the execution of these actions or stages is not necessarily performed sequentially, but may be performed in turn or alternately with other actions or at least part of other actions or stages.

Figure 7:
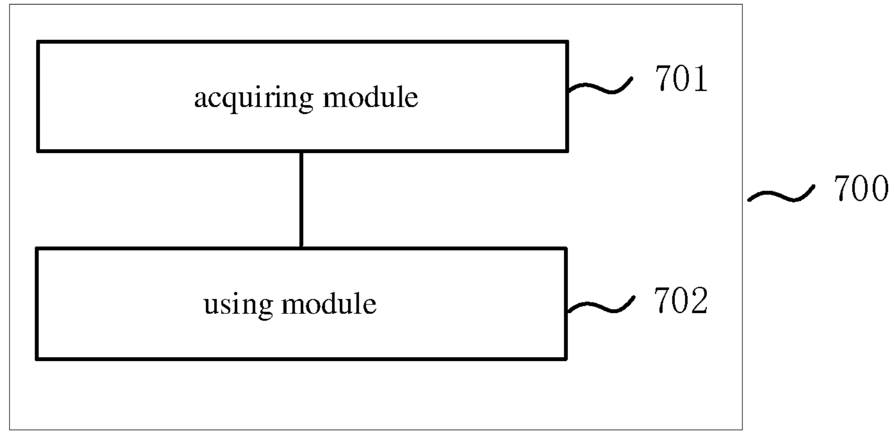
FIG. 7 is a schematic structural diagram of a terminal according to some embodiments of the present disclosure.

In one embodiment, as shown in FIG. 7, FIG. 7 is a schematic structural diagram of a terminal according to some embodiments of the present disclosure, the terminal includes: an acquiring module 701 and a using module 702.

The acquiring module 701, configured to acquire a timing advance (TA) shared by a second terminal to a first terminal, the second terminal and the first terminal access a same cell, and the second terminal is located within the first range around the first terminal;

The using module 702, configured to use the TA shared by the second terminal to perform an uplink synchronization with a base station by the first terminal in response to the first terminal failing to receive a TA sent by a base station in time.

In some embodiments, the using module 702 may be specifically configured to use the TA shared by the second terminal to perform uplink synchronization with the base station by the first terminal when the uplink synchronization state of the first terminal satisfies the requirements for using the shared TA.

In some embodiments, the shared TA using condition may include: a number of times the first terminal performs the uplink synchronization with the base station using a TA shared by another terminal in history is less than a first number of times.

In some embodiments, the shared TA using condition may include: a duration of the first terminal performing the uplink synchronization using the TA shared by another terminal with the base station in history is less than a first duration.

In some embodiments, the shared TA using condition may include: a difference between the TA received by the first terminal from the base station last time and the TA shared by the second terminal is less than a first difference.

In some embodiments, the terminal may further include:

An idle state entering module, which may be configured for a first terminal to enter an idle state in response to the first terminal not meeting the shared TA using condition.

In some embodiments, the idle state entering module may be specifically applied to detect a quality of service obtained by a first terminal from a cell the first terminal accesses; the first terminal enters an idle state in response to the quality of the service being worse than a first service quality.

In some embodiments, the using module may be further applied to perform the uplink synchronization with a base station using the TA shared by the second terminal to in response to the quality of the service being the same as or better than the first service quality.

In some embodiments, the acquiring module 701 may be specifically applied to acquire the TA shared by the second terminal to the first terminal from the server, the server may be configured to receive and store the TA shared by the second terminal.

In some embodiments, the acquiring module 701 may be specifically configured to acquire a short-range communication broadcast signal broadcasted by the second terminal based on a short-range communication technology, the short-range communication broadcast signal may carry the TA shared by the second terminal.

For specific limitations on the terminal, refer to the above-mentioned limitation on the uplink synchronization method, which will not be repeated here. Each module in the above-mentioned terminal can be fully or partially realized by software, hardware and a combination thereof. The above-mentioned modules may be embedded in or independent of the processor in the terminal in the form of hardware, and may also be stored in the memory of the terminal in the form of software, so that the processor can invoke and execute the corresponding operations of the above-mentioned modules.

Figure 8:
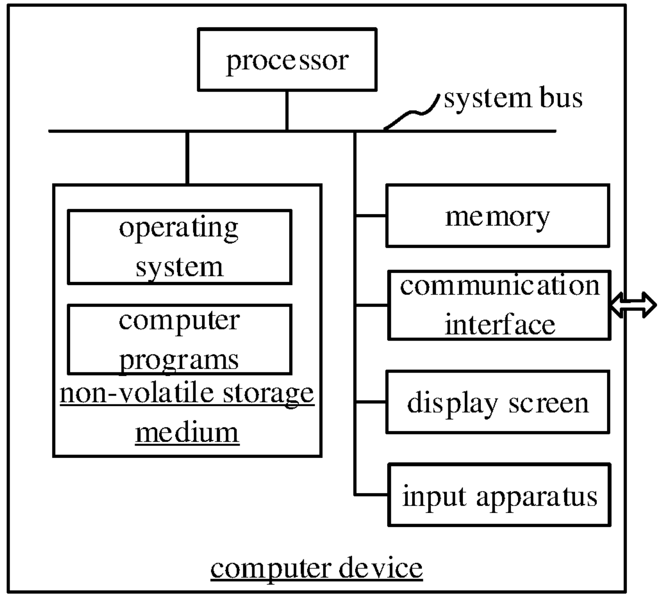
FIG. 8 is a diagram of an internal structure of a computer device according to some embodiments.

In some embodiments, a computer device is provided, the computer device may be a terminal, and its internal structure diagram may be illustrated in FIG. 8. FIG. 8 is a diagram of an internal structure of a computer device according to some embodiments. The computer device includes a processor, a memory, a communication interface, a display screen and an input apparatus which are connected through a system bus. The processor of the computer device may be applied to provide calculation and control capabilities. The memory of the computer device includes a non-volatile storage medium and an internal memory. The non-volatile storage medium stores an operating system and computer programs. The internal memory provides environment for the operation of the operating system and computer programs in the non-volatile storage medium. The communication interface of the computer device may be applied to communicate with an external terminal in a wired or wireless manner, and a wireless communication may be realized through WIFI, an operator network, NFC (Near Field Communication) or other technologies. The computer program is executed by the processor to implement the uplink synchronization method. The display screen of the computer device may be a liquid crystal display screen or an electronic ink display screen, and the input apparatus of the computer device may be a touch layer covered on the display screen, or a button, a trackball or a touch pad arranged on the casing of the computer device, and may also be an external keyboard, a touchpad, or a mouse.

Those skilled in the art can understand that the structure shown in FIG. 8 is only a block diagram of a partial structure related to the solution of this disclosure, and does not constitute a limitation on the computer device to which the solution of this disclosure is applied. The specific computer device can have more or fewer components than which shown in the figures, or some components may be combined, or have a different component.

In some embodiments, a computer device is provided, including a memory and a processor, a computer program is stored in the memory, and the processor implements the operations of the aforesaid embodiments of each method when executing the computer program.

In some embodiments, a computer-readable storage medium is provided, on which a computer program is stored, and when the computer program is executed by a processor, the operations of the aforesaid embodiments of each method are implemented.

Those skilled in the art can understand that all or part of the operations in the various methods in which the above embodiments can be accomplished by instructing the relevant hardware through the computer program, and the computer program can be stored in the computer readable storage medium, the computer program may include the processes of the embodiments of the above methods when executed. Any references to the memory, the storage, the database or other media used in the various embodiments provided in the present disclosure may include at least one of a non-volatile memory and a volatile memory. The non-volatile memory may include: a Read Only Memory (ROM), a magnetic tape, a CD, a floppy disk, flash memory or optical memory and the like. The volatile memory may include random a Random Access Memory (RAM) or an external cache memory. By way of illustration and not limitation, the RAM can be in various forms, such as Static Random Access Memory (SRAM) or Dynamic Random Access Memory (DRAM) and the like.

The technical features of the above embodiments can be combined arbitrarily, for describing concisely, all possible combinations of the technical features in the above embodiments are not described. However, as long as no contradiction exists in the combination of these technical features, they should all be considered to be within the range described in this specification.

The above-mentioned embodiments only represent several implementations of the present disclosure, and the description thereof is relatively specific and detailed, but it should not be construed as limiting the scope of the patent for the invention. It should be noted that those skilled in the art can make several modifications and improvements without departing from the concept of the present disclosure, and these all belong to the protection scope of the present disclosure. Therefore, the protection scope of the patent application should be based on the appended claims.

What is claimed is:

1. A first terminal, comprising a memory and a processor; wherein the memory stores a computer program; the computer program is executable by the processor to cause the processor to:

acquire a timing advance (TA) shared by a second terminal to the first terminal, wherein the second terminal and the first terminal access a same cell, and the second terminal is located within a first range around the first terminal; and perform an uplink synchronization with a base station using the TA shared by the second terminal, in response to the first terminal failing to receive a TA sent by the base station in time;

wherein when performing the uplink synchronization with the base station using the TA shared by the second terminal, the processor is further caused to:

perform the uplink synchronization with the base station using the TA shared by the second terminal, in response to an uplink synchronization state of the first terminal meeting a shared TA using condition;

wherein the shared TA using condition comprises one of:

a number of times the first terminal performs the uplink synchronization with the base station using a TA shared by another terminal in history being less than a first number of times;

a duration of the first terminal performing the uplink synchronization with the base station using a TA shared by another terminal in history being less than a first duration; and a difference between the TA received by the first terminal from the base station last time and the TA shared by the second terminal being less than a first difference.

2. The first terminal as claimed in claim 1, wherein the computer program causes the processor further to:

enter an idle state, in response to the first terminal not meeting the shared TA using condition.

3. The first terminal as claimed in claim 2, wherein when performing the entering an idle state, the computer program causes the processor further to:

detect quality of service obtained from the cell the first terminal accesses; and enter the idle state, in response to the quality of the service being worse than a first service quality.

4. The first terminal as claimed in claim 3, wherein the computer program causes the processor further to:

perform the uplink synchronization with the base station using the TA of the second terminal, in response to the quality of the service being the same as or better than the first service quality.

5. The first terminal as claimed in claim 1, wherein when performing the acquiring a timing advance (TA) shared by a second terminal to the first terminal, the computer program causes the processor further to:

acquire the TA shared by the second terminal to the first terminal from a server, wherein the server is configured to receive and store the TA shared by the second terminal.

6. The first terminal as claimed in claim 5, wherein before the acquiring the TA shared by the second terminal to the first terminal from a server, the computer program causes the processor further to:

send notification information to the server; wherein the notification information comprises a first cell identity of the cell the first terminal accesses and a terminal identity of a candidate terminal searched by the first terminal based on a short-range communication technology, and the notification information is configured for the server to determine the second terminal.

7. The first terminal as claimed in claim 5, wherein before the acquiring the TA shared by the second terminal to the first terminal from a server, the computer program causes the processor further to:

send the notification information to the server, in response to the first terminal failing to receive the TA sent by the base station in time.

8. The first terminal as claimed in claim 5, wherein before the acquiring the TA shared by the second terminal to the first terminal from a server, the computer program causes the processor further to:

send the notification information to the server, in response to the first terminal receiving the TA sent by the base station, wherein the notification information further comprises the TA received by the first terminal.

9. The first terminal as claimed in claim 1, wherein when performing the acquiring a timing advance (TA) shared by a second terminal to the first terminal, the computer program causes the processor further to:

acquire a short-range communication broadcast signal broadcasted by the second terminal based on a short-range communication technology, wherein the short-range communication broadcast signal carries the TA shared by the second terminal.

10. The first terminal as claimed in claim 9, wherein when performing the acquiring a timing advance (TA) shared by a second terminal to the first terminal, the computer program causes the processor further to:

determine the second terminal from one or more candidate terminals based on a second cell identity of a cell each candidate terminal accesses in the short-range communication broadcast signal; and acquire the TA shared by the second terminal to the first terminal based on a TA of each candidate terminal in the short-range communication broadcast signal.

11. The first terminal as claimed in claim 1, wherein when performing the performing an uplink synchronization with a base station using the TA shared by the second terminal, in response to the first terminal failing to receive a TA sent by the base station in time, the computer program causes the processor further to:

in response to the second terminal comprising a plurality of second terminals, determine a target TA from TAs of the plurality of second terminals, according to the TAs of the plurality of second terminals and a historical TA sent by the base station to the first terminal last time; and perform the uplink synchronization with the base station using the target TA.

12. The first terminal as claimed in claim 11, wherein when performing the determining a target TA from TAs of the plurality of second terminals, according to the TAs of the plurality of second terminals and a historical TA sent by the base station to the first terminal last time, the computer program causes the processor further to:

determine a product of each of the TAs of the plurality of second terminals and the historical TA sent by the base station to the first terminal last time; and take one of the TAs of the plurality of second terminals corresponding to a minimum product as the target TA.

13. The first terminal as claimed in claim 11, wherein when performing the determining a target TA from TAs of the plurality of second terminals, according to the TAs of the plurality of second terminals and a historical TA sent by the base station to the first terminal last time, the computer program causes the processor further to:

determine a difference between each of the TAs of the plurality of second terminals and the historical TA; and take one of the TAs of the plurality of second terminals corresponding to a minimum difference as the target TA.

14. An uplink synchronization method, comprising:

acquiring, by a first terminal, a timing advance (TA) shared by a second terminal to the first terminal, wherein the second terminal and the first terminal access a same cell, and the second terminal is located within a first range around the first terminal; and performing, by the first terminal, an uplink synchronization with a base station using the TA shared by the second terminal, in response to the first terminal failing to receive a TA sent by the base station in time;

wherein the performing, by the first terminal, an uplink synchronization with a base station using the TA shared by the second terminal, comprises:

performing, by the first terminal, the uplink synchronization with the base station using the TA shared by the second terminal, in response to an uplink synchronization state of the first terminal meeting a shared TA using condition;

wherein the shared TA using condition comprises one of:

a number of times the first terminal performs the uplink synchronization with the base station using a TA shared by another terminal in history being less than a first number of times;

a duration of the first terminal performing the uplink synchronization with the base station using a TA shared by another terminal in history being less than a first duration; and a difference between the TA received by the first terminal from the base station last time and the TA shared by the second terminal being less than a first difference.

15. The method as claimed in claim 14, wherein the acquiring, by a first terminal, a timing advance (TA) shared by a second terminal to the first terminal comprises:

acquiring, by the first terminal, the TA shared by the second terminal to the first terminal from a server, wherein the server is configured to receive and store the TA shared by the second terminal.

16. A non-transitory computer-readable storage medium of a first terminal, on which a computer program is stored, wherein when the computer program is executed by a processor of the first terminal, the processor is caused to perform:

acquiring a timing advance (TA) shared by a second terminal to the first terminal, wherein the second terminal and the first terminal access a same cell, and the second terminal is located within a first range around the first terminal; and performing an uplink synchronization with a base station using the TA shared by the second terminal, in response to the first terminal failing to receive a TA sent by the base station in time;

wherein when performing the uplink synchronization with the base station using the TA shared by the second terminal, the processor is further caused to:

perform the uplink synchronization with the base station using the TA shared by the second terminal, in response to an uplink synchronization state of the first terminal meeting a shared TA using condition;

wherein the shared TA using condition comprises one of:

a number of times the first terminal performs the uplink synchronization with the base station using a TA shared by another terminal in history being less than a first number of times;

a duration of the first terminal performing the uplink synchronization with the base station using a TA shared by another terminal in history being less than a first duration; and a difference between the TA received by the first terminal from the base station last time and the TA shared by the second terminal being less than a first difference.

* * * * *